United States Patent

Yoshida et al.

[11] Patent Number: 5,173,628
[45] Date of Patent: Dec. 22, 1992

[54] BRUSHLESS MOTOR

[75] Inventors: Norihide Yoshida; Hiroshi Sakashita, both of Komagane, Japan

[73] Assignee: Kabushiki Kaisha Sankyo Seiki Seisakusho, Nagano, Japan

[21] Appl. No.: 668,495

[22] PCT Filed: Sep. 27, 1989

[86] PCT No.: PCT/JP89/00978
§ 371 Date: Mar. 20, 1991
§ 102(e) Date: Mar. 20, 1991

[87] PCT Pub. No.: WO90/03686
PCT Pub. Date: Apr. 5, 1990

[30] Foreign Application Priority Data

Sep. 29, 1988 [JP] Japan .................. 63-127955[U]

[51] Int. Cl.⁵ .................. H02K 11/00; H02K 7/14; H02K 1/18
[52] U.S. Cl. .................. 310/71; 310/67 R; 310/217
[58] Field of Search .................. 310/67 R, 71, 91, 216, 310/217, DIG. 6

[56] References Cited

U.S. PATENT DOCUMENTS

| 4,633,110 | 12/1986 | Genco et al. | 310/71 |
| 4,673,834 | 6/1987 | Wrobel | 310/71 |
| 4,682,065 | 7/1987 | English et al. | 310/67 R |
| 4,779,330 | 10/1988 | Genco et al. | 310/71 |
| 4,800,307 | 1/1989 | Papst | 310/71 |

FOREIGN PATENT DOCUMENTS

| 0147762 | 7/1986 | Japan | 310/261 |
| 0228937 | 9/1991 | Japan | 310/71 |

Primary Examiner—Emanuel T. Voeltz
Assistant Examiner—C. LaBalle
Attorney, Agent, or Firm—Notaro & Michalos

[57] ABSTRACT

A brushless motor improving the structure for connecting the stator coil to the substrate to facilitate the operation of connection and assembling. The constitution comprises a rotor having a rotor magnet (11), a stator core (2) on which the stator coil (7) is wound to be opposed to the rotor magnet (11), a circuit substrate (4) connected to the stator coil (7), and an insulating core holder (3) which holds a terminal to which the coil will be connected and which mounts the stator core (2), the core holder (3) being placed on said circuit substrate (4) and said terminal being soldered to terminal portions on the circuit substrate (4).

6 Claims, 6 Drawing Sheets

BRUSHLESS MOTOR

DESCRIPTION

1. Technical Field

The present invention relates to a brushless motor, and in further detail to a brushless motor improved in the connection between a stator coil and a circuit substrate.

2. Background Art

There has been a conventional motor with a core opposed to a peripheral magnet in which, as shown in FIG. 14 or 15, a lead 19 from a stator coil 18 wound to a stator core 17 is directly connected with solder to a circuit board 20. Soldering this lead 19 to the circuit substrate 20 requires adjustments, such as positioning of the lead 19, adjusting its length and the like, which is manually conducted. As a result, in the conventional motor construction, the lead 19, as similar to other electronic parts, can not be automatically mounted on the circuit substrate 20. Also, with increased phase number of the coil 18, the soldering work will be time-consuming and reliability of the motor decreases. In addition, the conventional motor is directly soldered to the circuit substrate 20 without midsection of the lead 19 supported, posing a possibility of the lead 19 being easily cut due to motions of associated parts, or vibration, shocks of the same, or the like. Consequently, the conventional motor is poor in reliability.

In further defective aspect, connecting the lead 19 with a terminal in three-phase winding shown in FIG. 16 will probably require to insert the three leads 19, 22, 23, respectively of U, V and W phases, into a common terminal 21 as shown in FIG. 17. In that case, however, the terminal 21, in which those leads 19, 22, 23 are inserted, is naturally greater in dimensions, and further, to fix all the leads 19, 22, 23, the winding end of first phase is temporarily fixed, then likewise is done that of second phase, and subsequently, when the winding end of third phase appears, all of the three leads have to be simultaneously inserted into the terminal 21 and clamped together, which thus results in a troublesome work.

DISCLOSURE OF THE INVENTION

An object of the invention is to provide a brushless motor which can improve efficiency of operation. More specifically, it is a first object of the invention is to not only permit automatic connection of stator coils but also eliminate steps for disposing of the coils after they have been wound; it is a second object of the invention to enable automatic mounting of a set of stator formed by a stator core and stator coils wound thereon onto a substrate, as with other electronic parts, during circuit assembling process; and it is a third object of the invention to permit such stator set to be fixed to the substrate by means of reflow soldering, as with other electronic parts.

To achieve the above-stated objects, the present invention provides a brushless motor including a rotor having a rotor magnet, a stator core with a coil wound thereon, the stator core being disposed in a facing relation with the rotor magnet, and a substrate connected with the coil, wherein a terminal area is formed only on a surface of the substrate facing toward the stator core, wherein there is provided a core holder made of an insulating material, to which the stator core is coupled as well as which retains a terminal connected with the coil, and wherein the core holder is placed upon the substrate by securing a locating pin formed integrally with the core holder into the substrate and locating the core holder in place thereon, while simultaneously the terminal is placed on the terminal area of the substrate and the terminal is soldered to the terminal are on the substrate.

Accordingly, since in the brushless motor of the invention, the end of the stator coil forming a winding is automatically connected with the terminal, without changes, there is no hitherto requirement for manual connection of associated leads subsequent to the winding of the coil and thus the assembling processes are simplified. This makes possible use of electric resistance welding to fix the leads to the terminal, which will render easier and assured the connection of the leads with the terminal, providing an increased reliability. Further, according to the invention, the set of stator can be handled as it is with the end of stator coil being fixed to the terminal, hence enabling automatic mounting of the stator set onto a substrate, as with other electronic parts, during circuit assembling process, and permitting the stator set to be fixed to the substrate by means of reflow soldering, as with other electronic parts, which facilitates the soldering operations. Still further, the lead, by reason of its being supported by the terminal, is prevented from being cut off due to motions of parts, vibrations and shocks thereof. Because of no manual soldering being required, a working time is reduced and reliability can be increased remarkably.

Still further, according to the invention, winding and connecting the stator coils is conducted as follows: The winding end point of stator coil of a U-phase, which has started its winding from one terminal, is inserted into and passed from a common terminal. Then, this stator coil is wound up to next core of a V-phase in a direction reversing the winding in said U-phase, to thereby form a coil of V-phase. Then, the winding end point of the V-phase coil is inserted into other terminal and cut off, after which, the end of stator coil of a W-phase is inserted into other terminal and starts to be wound on the core of W-phase. The winding end point of such W-phase coil is then inserted into the common terminal, and retained there together with the end of the stator coil which has already passed from the terminal, after which, only the W-phase coil is cut off. Hence, in contrast to the ordinary three-phase coil windings, the common terminal can be formed at a size equal to that of other terminals and there is no need to employ such complicated way for fixing each coil temporally, which thus makes possible the automatic connection of the coils.

BRIEF DESCRIPTION OF THE DRAWING

FIGS. 1 to 13 illustrate several embodiments of the invention, in which,

FIG. 1 is a mid-vertical section of a brushless motor;

FIG. 2 is a bottom plan view showing an example of a stator set;

FIG. 3 is an enlarged perspective view showing the central portion of the botton of the stator set in FIG. 2;

FIG. 4 is an enlarged schematic perspective view illustrating principal parts shown in FIG. 3;

FIG. 5 is an enlarged sectional view of terminal portion shown in FIG. 1;

FIG. 6 is a plan view of a stator core;

FIG. 7 is a plan view of a bearing holder;

FIG. 8 is a perspective view of the bearing holder;

FIG. 9 is a plan view of a substrate;

FIG. 10 is a development illustrating winding method of a stator coil;

FIGS. 11, 12 and FIG. 13 are side elevations which show other examples of terminals;

THE BEST MODE FOR CARRYING OUT THE INVENTION

Figure 1:
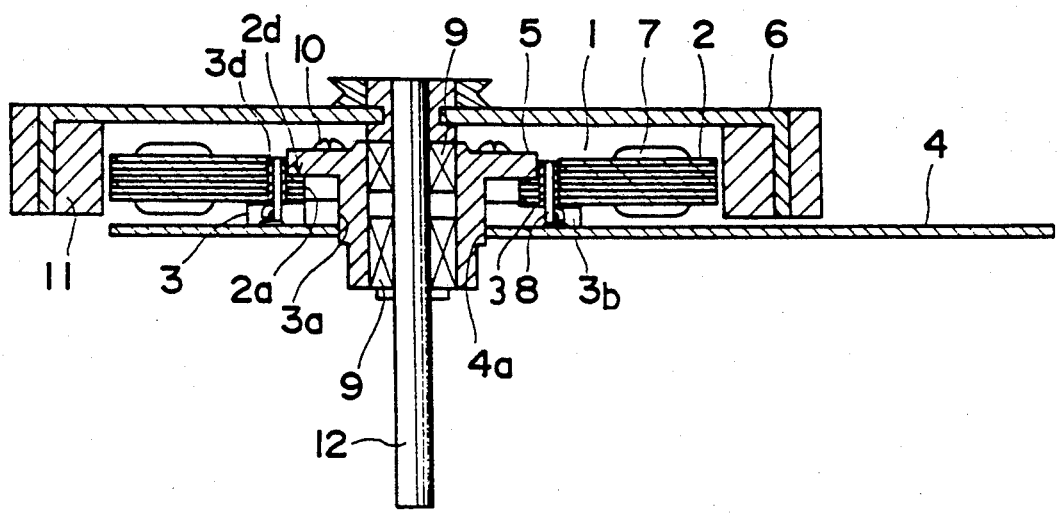

The present invention will now be described with reference to embodiments shown in the drawings.

FIG. 1 shows an example of a brushless motor according to the present invention. This brushless motor comprises a rotor case 6 rotatably supported by a shaft 12, a rotor magnet 11 fixed in the internal peripheral wall of this case 6, a stator core 2 so disposed that its peripheral surfaces are in a facing relation with that of the magnet 11, a stator coil 7 wound to each salient pole 2e, a circuit substrate 4 which supports the stator core 2 and is connected to the stator coil 7, a core holder 3 for mounting fixedly the stator core 2 on the circuit substrate 4, and a bearing holder 5 having, a bearing 9 a provided therein and allowing the rotor shaft 12 to be rotatably supported by the substrate. This motor is driven by controlling respective stator coils 7 of respective phases through a rectifying system which is not illustrated, the system comprising a magnetic sensor, a semi-conductor switch and the like. A set of stator 1 is thus constituted by the foregoing stator core 2, stator coil 7 wound to a salient pole 2e of the stator core 2, core holder 3 made of insulating material such as resins, ceramics and the like, and a plurality of terminals 8 supported by the core holder 3. The terminal 8 of the set of stator 1 is connected to the circuit substrate 4 by soldering. The stator coil 7 is connected with the circuit substrate 4.

The stator set 1 is placed on the circuit substrate 4 with the base of the core holder 3 in contact with the circuit substrate, the core holder being fitted to the center of the stator core 2. This stator set 1 is integrally fixed to the substrate 4, by means of vis 10, together with the bearing holder 5 which is to pass through-holes 2a, 3a formed respectively, centrally of the stator core 2 and the core holder 3 as well as through holes 4a of the substrate 4. The bearing holder 5 is inserted into those through-holes 2a, 3a, and 4a from top of the stator core 2, while the flange portion 5a formed in the upper end of the holder 5 is engaged upon a stepped part 2d of the stator core 2. The fixation of the holder 5 is carried out after sandwiching the stator core 2 and core holder 3 between the circuit substrate 4 and holder 5 per se. The stator coil 7 wound to the stator core 2 is connected with the terminal 8.

Figure 3:
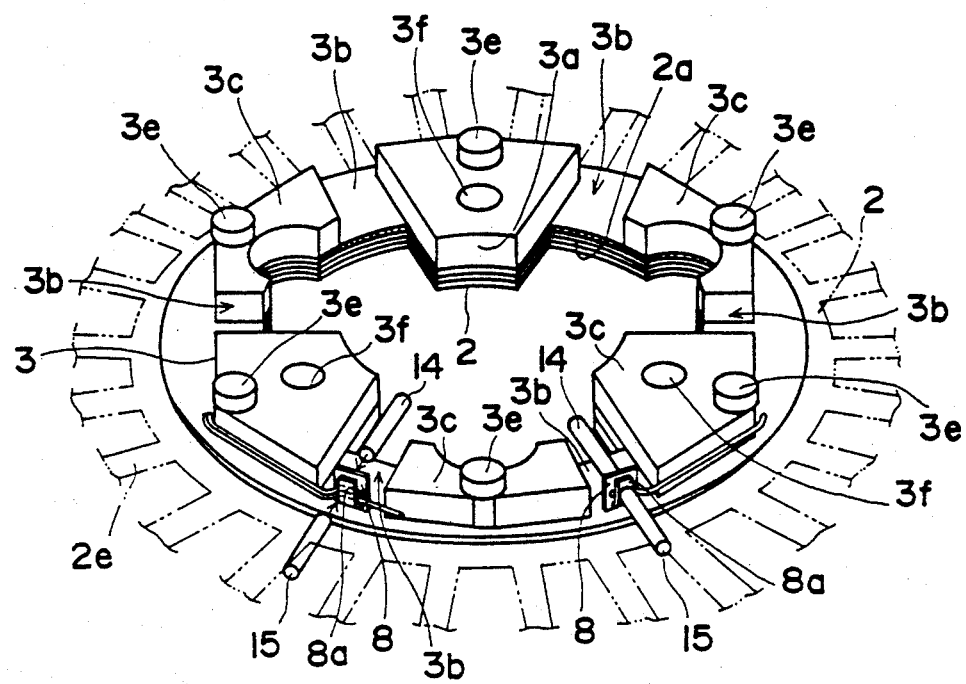
Figure 6:
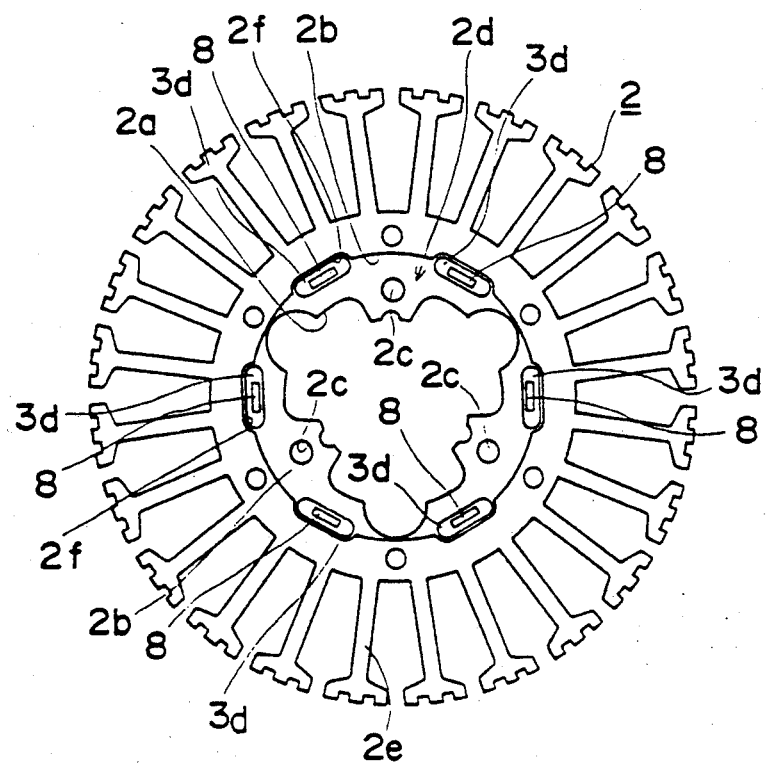

As shown in FIGS. 3 and 6, the holes 2a, 3a, which are defined centrally of both stator core 2 and core holder 3, are so formed with a collective mixture of circular holes as to generally represent a triangular shape on the whole, to permit insertion thereinto of central protrudent portion 5c of the bearing holder 5. By contrast, the stator core 2, as shown in FIGS. 1 and 6, has, perforated in its upper layers, a substantially circular through-hole as different from the through-hole 2a perforated in its lower layers of silicon steel plate, whereupon in the upper layers of stator core 2, there is defined a substantially circular recessed part 2b which thus defines therein the foregoing stepped area 2d to be engaged on the flange portion 5a at the upper end of the bearing holder 5, thereby allowing such flange portion 5a of bearing holder 5 to be fitted in the stator core 2. This permits the motor to be formed in a thinner way.

Figure 2:
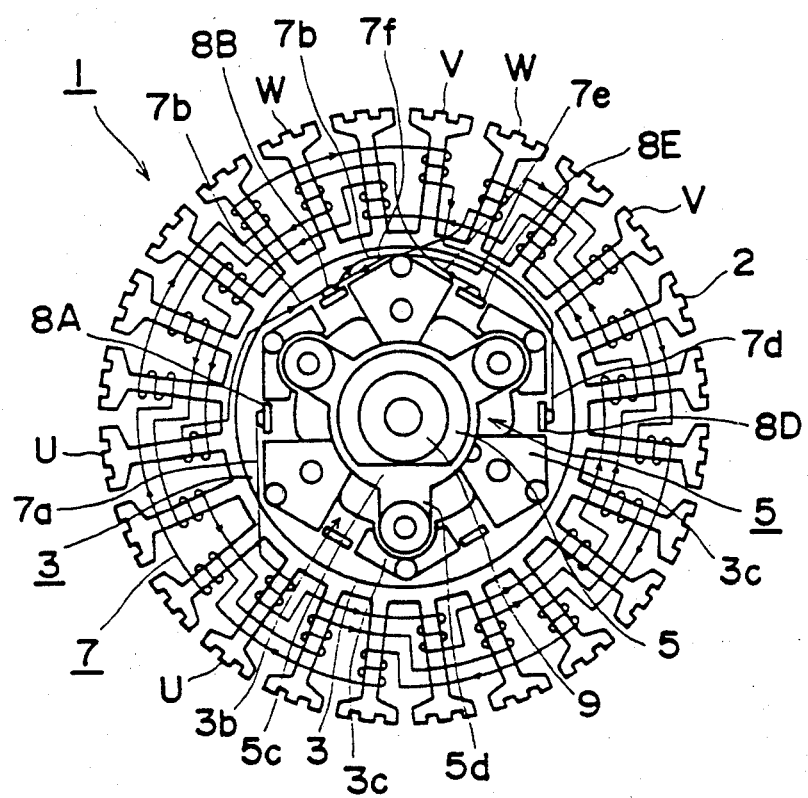
Figure 4:
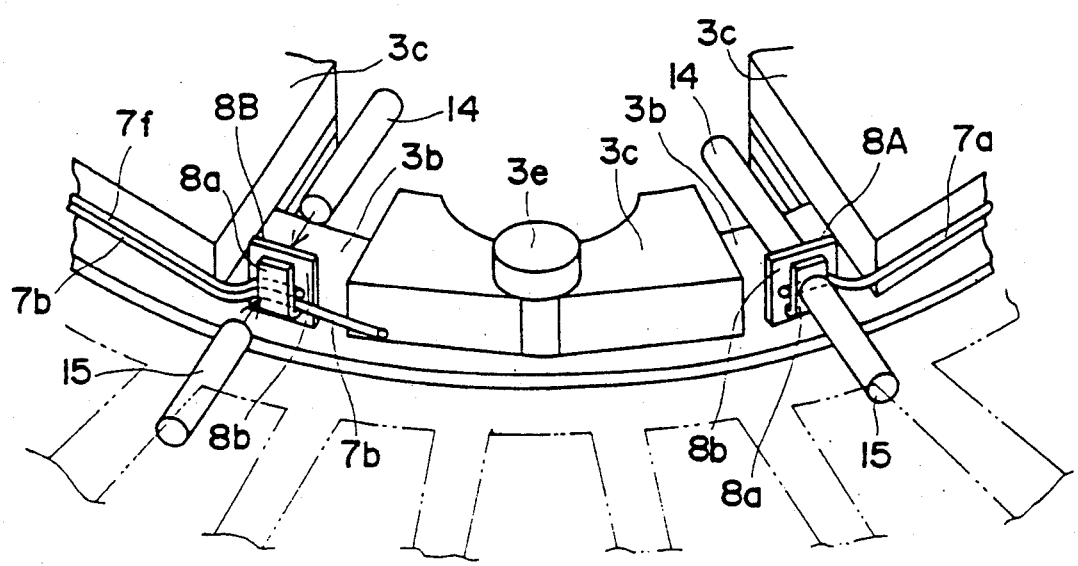

The core holder 3, as seen from FIGS. 2 to 4, is formed at its base surface with base portions 3c to be contacted with the circuit substrate 4, which base portions 3c are disposed annually spaced apart from one another at given intervals, with grooves 3b being respectively defined in each space adjoining the base portions 3c. In the grooves 3b, as in FIGS. 1 and 5, there are formed retaining sections 3d which project towards the upper layer side of the stator core 2, and the terminals 8 are mounted in the retaining sections 3d. Fixation of those retaining sections 3d is such that they are penetrated through the respective penetrated areas 2d of stator core 2 and fitted within recessions 2f formed in the peripheral wall of recessed part 2b. FIG. 6, in plan, indicates the projected state of the retaining sections 3d. It is to be seen that such formation of grooves 3b in the core holder 3 and installation of the terminals 8 in the grooves 3b advantageously make it easier to set electrodes 14 for connecting the stator coils 7 with the terminals 8 by electric resistance welding.

As illustrated in FIG. 3, locating pins 3e are provided for the base 3c in order to locate the core holder in 3c respect to the circuit substrate, and also for the base 3c, there are provided through-holes 3f through which are passed the vises 10 for fixation.

On the other hand, in the stator core 2, as shown in FIG. 6, there are formed vis through-holes 2c at locations corresponding to the vis through-holes 3f of the core holder 3.

Figure 7:
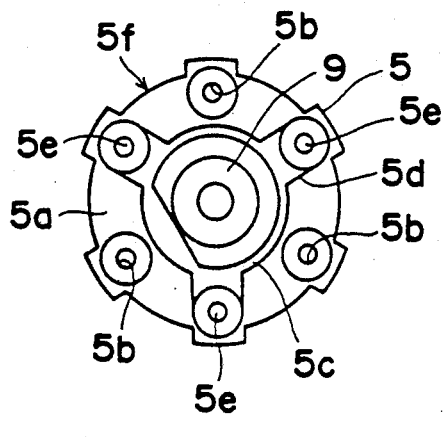
Figure 8:
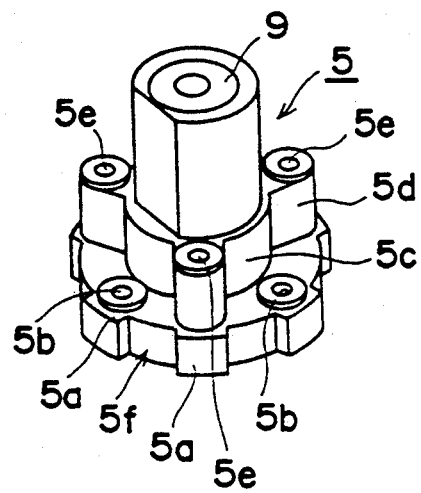

The bearing holder 5 has the bearing 9 provided therein, by means of which the shaft 12 is mounted rotatably to the circuit substrate 4. As shown in FIG. 1, FIG. 7 and FIG. 8, this bearing holder 5 is of a cylindrical form having a generally T-shaped configuration in section, which is provided with the flange portion 5a to be used for pressing the stator set 1 towards the side of circuit substrate 4, and with the central protrudent portion 5c to be fitted in the stator core 2, core holder 3 and circuit substrate 4. The flange portion 5a is formed with a vis through-hole 5b and further formed with recessed regions 5f adapted for avoiding contact of the flange portion with the retaining sections 3d. The central protrudent portion 5c is formed at its periphery with a plurality of projected parts 5d, and further a threaded hole 5e is formed in each of the projecting parts 5d.

Figure 9:
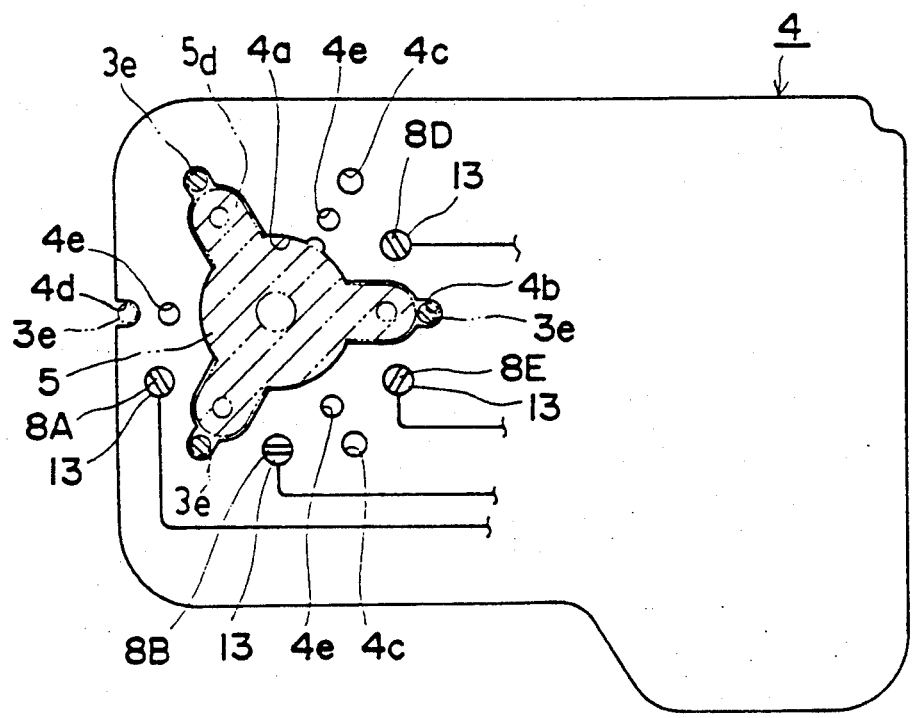

The circuit substrate 4 is mounted with a control circuit and the like to control electric supply to the stator coil 7 of the stator set 1 mentioned above. In the present embodiment, the circuit substrate 4 has also a function to support the stator set 1 and a rotor set. For example, the circuit substrate 4 comprises a steel plate whose surface is provided with a copper-foiled circuit conductive pattern coated with insulating membrane. In this circuit substrate 4, as depicted in FIG. 9, there is formed a through-hole 4a generally in triangular shape so dimensioned as to allow fit insertion thereinto of the central protrudent portion 5c and plural projected parts 5d of the bearing holder 5. Further, that through-hole 4a has, formed at its respective apexes, notched areas 4b in which the locating pins 3e of core holder 3 are fitted respectively. The circuit substrate 4 is also formed with through-holes 4c and cut-away part 4d which lie on the same circumference of circle along which are disposed the foregoing notched areas 4b defined peripherally of the through-hole 4a, the through-holes 4c and cut-away part 4d being so formed that other locating pins 3e of core holder 3 can be fitted thereinto. In addition, in the circuit substrate 4, threaded holes 4e are formed at the points corresponding to vis through-holes 2c and 3f on the side of stator set 1. Yet further, in the same substrate 4, there are formed terminal points 13 such that they are disposed at the locations corresponding to the terminals 8 which are secured in the core holder 3.

The foregoing stator set 1, bearing holder 5 and substrate 4 are fitted together and juxtaposed with one another, and further integrally fixed by the vises 10. Those vises 10 pass through the vis through-holes 2c of stator core 2 and the through-holes 3f of core holder 3, and are screwed into the threaded holes 4e of circuit substrate 4.

Figure 5:
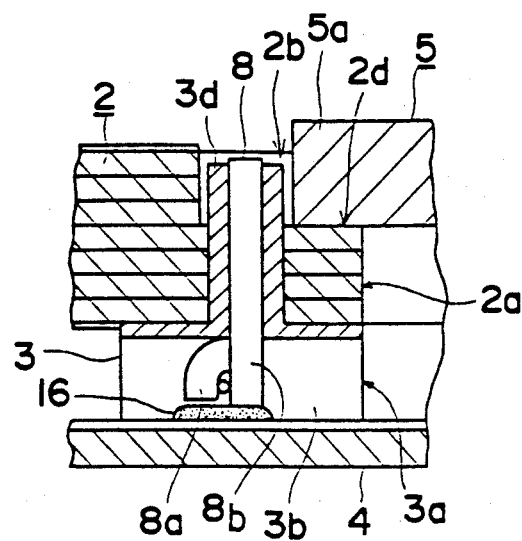

The terminal 8 as shown in FIG. 5, includes a base 8b and a tongue strip 8a, thereby being of U-shaped form, the base and tongue strip being inserted into the retaining section 3d of core holder 3. Leads 7a, 7d to 7f or a crossover track 7b are inserted and fixed between the base 8b and tongue strip 8a. In this terminal 8, the respective opposing surfaces of tongue strip 8a and base 8b are not affected from oxidation by fusing, the tongue strip and base retaining at least leads 7a, 7d to 7f, or a crossover track 7b. The end of the terminal 8 to be connected with the terminal section 13 on the circuit substrate side 4 is not affected from oxidation by fusing, either.

A method of winding the stator coil 7 and connection of the stator coil 7 to the terminal 8 will now be described as below. In this context, it is noted that in the figures, the arrows given along the stator coil 7 show the direction in which the coil should be wound, and that designations U, V and W given at the respective salient poles 2e of the respective phases, in FIG. 2, serve to facilitate the understanding about the respective winding start points and winding end points of the stator coils 7.

Figure 10:
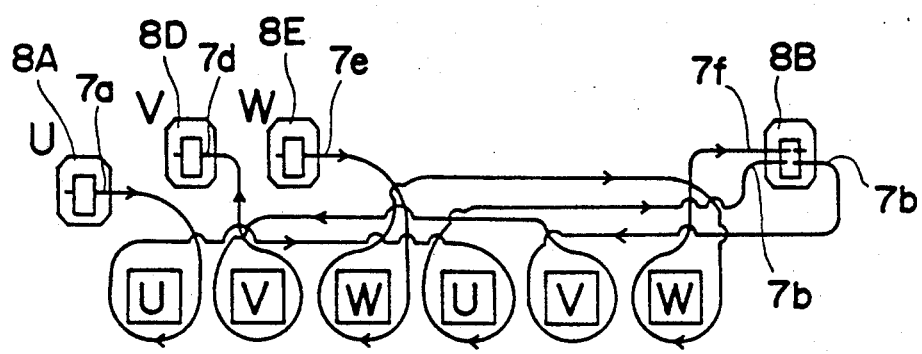

In three-phase stator connection, winding of the stator coil 7 to the stator core 2 is, for example, carried out as illustrated in FIGS. 2 and 10. At first, lead 7a of the U-phase is inserted into the terminal 8A and temporarily fixed thereto by gently flattening the tongue strip 8a. Then, the stator core 7 is wound up sequentially to respective corresponding cores 2e of the U-phase, using a coil-winding machine. The U-phase stator coil 7, when it finishes winding, is used as a crossover track 7b, and inserted into and passed through the common terminal 8B as illustrated in FIGS. 2 to 4 and FIG. 10. The crossover track 7b thus passed from that terminal is now used as a lead for winding initiation of the V-phase, and such V-phase stator coil is wound up sequentially to the respective cores 2e of V-phase in a direction reversing the winding direction of the U-phase. The V-phase stator coil, after being wound up, is used further as a lead 7d, inserted into a terminal 8D, temporarily fixed thereto by flattening the tongue strip 8a gently, and then cut off.

Next, a lead 7e of the W-phase is inserted into a terminal 8E and temporarily fixed thereto by gently flattening the tongue strip 8a, and thereafter the lead is wound up to the respective cores of the W-phase in sequence. The wound-up stator coil is, as a lead 7f, inserted into and temporarily fixed by the common terminal 8B together with the coil crossover track 7b and only the lead 7f is cut off.

The coil leads 7a, 7d, 7e, 7f and the coil crossover track 7b, which are inserted into their respective terminals 8, are temporarily fixed to each terminal 8A, 8D, 8E, 8B, respectively and thereafter those coil leads and coil crossover track 7b are, as shown in FIG. 3 and FIG. 4, welded by fusing to the respective terminals 8A, 8D, 8E, 8B. The welding is conducted as follows: Two electrodes 14, 15 are set on the opposite sides of the terminal 8, such that they are disposed respectively facing towards the base 8b and tongue strip 8a of the terminal 8, and then, while causing the electrodes to be pressed against the terminal, an electric currency is applied thereto, during which the coating on those leads is melt-stripped under Joule effect or heat generated by this fusing. As viewed from FIGS. 3 and 4, the electrodes 14, 15 on the right side are shown to be in the state where they are pressed to the terminal 8.

Thus-formed stator core 2 is fixed to the substrate 4 through the core holder 3. Positioning of the stator core 2 in respect to the substrate 4 is conducted by inserting each locating pin 3e of core holder 3, respectively, into the notched areas 4b, through-holes 4c and cut-away parts 4d formed in the substrate 4. In this instance, the terminal sections 13 of the substrate 4 are each applied a cream solder. Using a reflow furnace, as shown in FIG. 5, the end 8c of the terminal 8 projecting toward the substrate 4 side is fixed by solder 16 with the terminal section 13. Thereafter, the bearing holder 5 is fitted in the stator core 2 and fixedly secured to the substrate 4 by means of the vises 10.

The stator set 1, the bearing holder 5 and the substrate 4 are stacked in this order, according to the number of their associated parts mounted thereon, which therefore permits easy assembling and cost reduction for the assemblage.

The embodiment described above is a preferable one in this invention but is not limited thereto, and various alterations and modifications may be made without departing from the subject matter of the invention. A modified example of the terminal 8 is for instance illustrated in FIG. 11 and FIG. 13.

Figure 11:
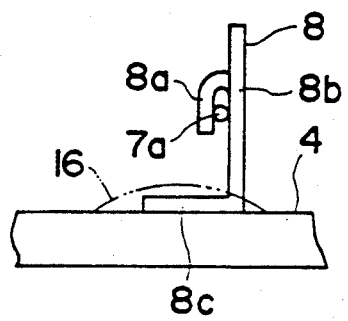

The terminal 8 shown in FIG. 11 is bent into L-shaped configuration, whereby its portion 8c which is in contact with the circuit substrate 4 is greater in dimensions so as to enhance a soldering effect between the terminal 8 and substrate 4.

Figure 12:
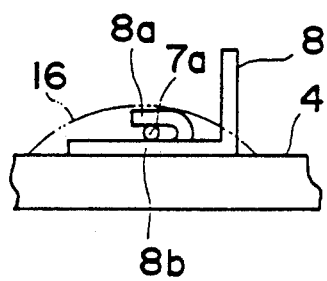

The terminal 8 shown in FIG. 12 is so bent into L-shaped configuration that its base portion 8b, which cooperates with the tongue strip 8a to retain the lead therebetween, is contacted with and fixed by soldering 16 to the circuit substrate 4. This not merely enhances the soldering effect between the terminal 8 and substrate 4, but also insures more positive connection between them. Additionally, such formation of the terminal 8 renders much thinner the stator set 1 and thus allows the motor to be formed in much thinner structure.

Figure 13:
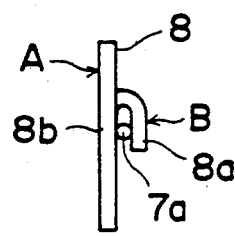
Figure 14:
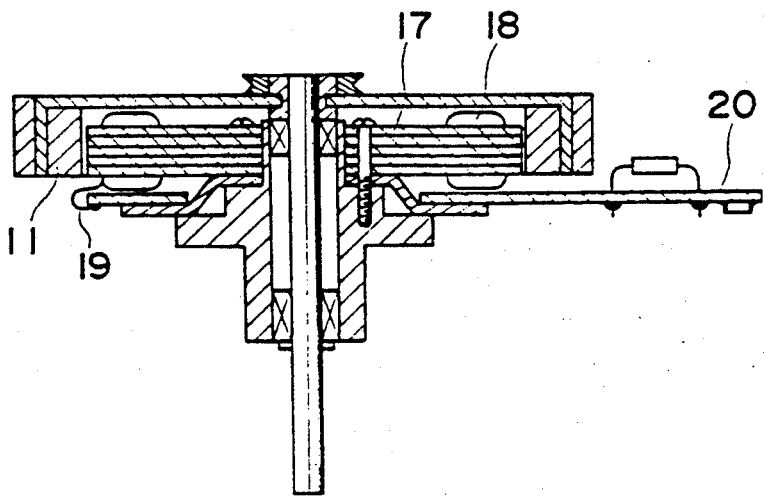
FIGS. 14 and 15 are mid-vertical sections, each illustrating conventional brushless motor.
Figure 15:
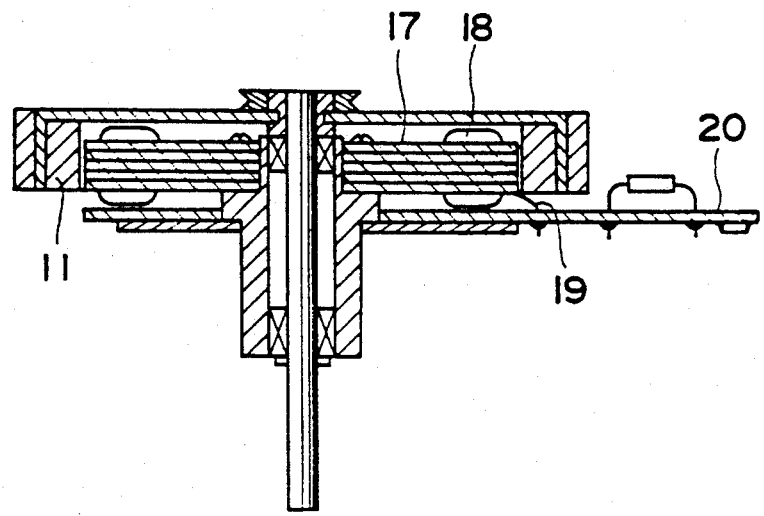
Figure 16:
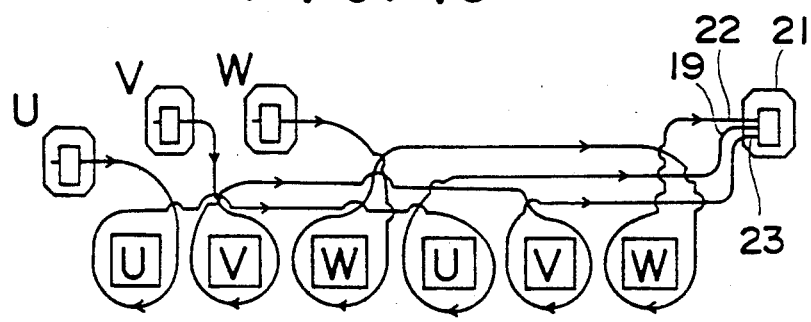
FIG. 16 is a development which explanatorily shows how the stator coil is to be wound if the terminal is used in the conventional motor construction.
Figure 17:
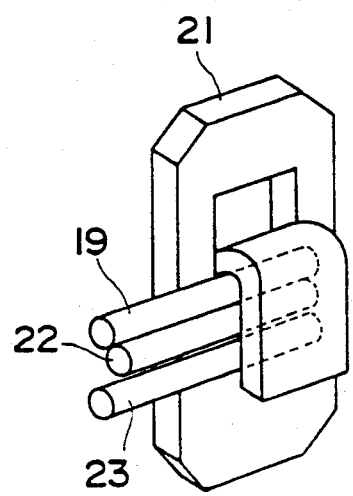
FIG. 17 is a perspective view illustrating a common terminal in such winding method as in FIG. 16.

FIG. 13 shows an example in which the terminal 8 has been formed, during press working process, taking into account especially the direction in which burr is created, so that burr is created at the sides of the terminal designated by characters A and B, and the lead can be easily cut off, using such burr.

It is noted here that the connection of the coil to the terminal may be effected by other soldering method than the foregoing fusing, namely such electric resistance welding as a spot welding or the like.

We claim:

1. A brushless motor including a rotor having rotor magnet, a stator core with a coil wound thereon, said stator core being diposed in a facing relation with said rotor magnet, and a substrate connected with said coil, comprising a terminal area formed only on a first surface of said substrate facing toward said stator core, a core holder made of an insulating material and having a second surface facing toward said first surface of said substrate, and a terminal retaining portion defined on said second surface, said terminal retaining portion being for retaining therein one end of a terminal connected with said coil, said stator core being coupled to said core holder, and said second surface of said core holder having integrally formed thereon, a locating pin, said core holder being placed on said first surface of said substrate by securing said locating pin into a hole formed in said substrate, while simultaneously bringing another free end of said terminal in contact with said terminal area of said substrate, so that said terminal is soldered to said terminal area.

2. A brushless motor as claimed in claim 1, wherein said stator core includes a plurality of salient poles each pole being represented by a number mn where m and n are positive integers, said coil being wound on each of said salient poles, a phase of said coil being represented by m, and a number of each pole of each phase being represented by n, said temrinal having a tongue strip into which at most two leads of said coil are inserted, and secured by said tongue strip, said core holder having a retaining portion to retain said terminal.

3. A brushless motor as claimed in claim 2, wherein said coil has a lead which is fixed to said terminal by an electric welding, said coil having at most two leads which are connected to a tonque strip of said terminal by fusing through an electric welding, said tongue strip being formed on said free end of said terminal.

4. A brushless motor as claimed in claim 1, characterized in that said core holder is fitted and fixed to said stator core and further said core holder is located in place by securing a locating pin formed at said core holder into said substrate.

5. A brushless motor as claimed in claim 1, wherein, in said second surface of said core holder, there are formed a plurality of retaining portions for retaining said one end of said terminal, each of said retaining portions passing through said stator core, and said stator core being juxtaposed with said core holder and fixed via said core holder to said first surface of said substrate by means of a vise.

6. A brushless motor as claimed in claim 1, characterized in that, in said stator core, there is formed a stepped portion to which a flange of a bearing holder is fitted.

* * * * *